Patented Nov. 10, 1931

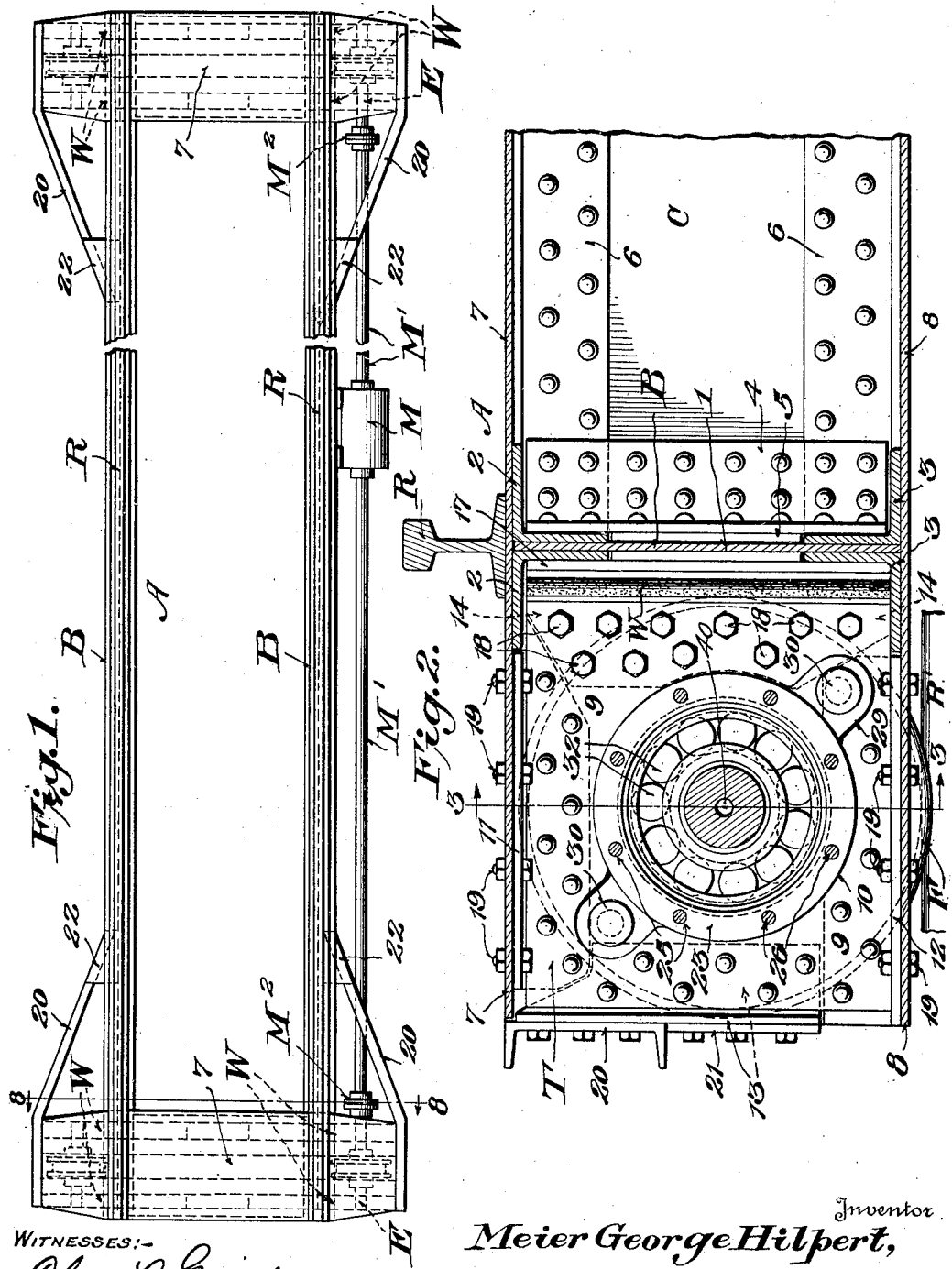

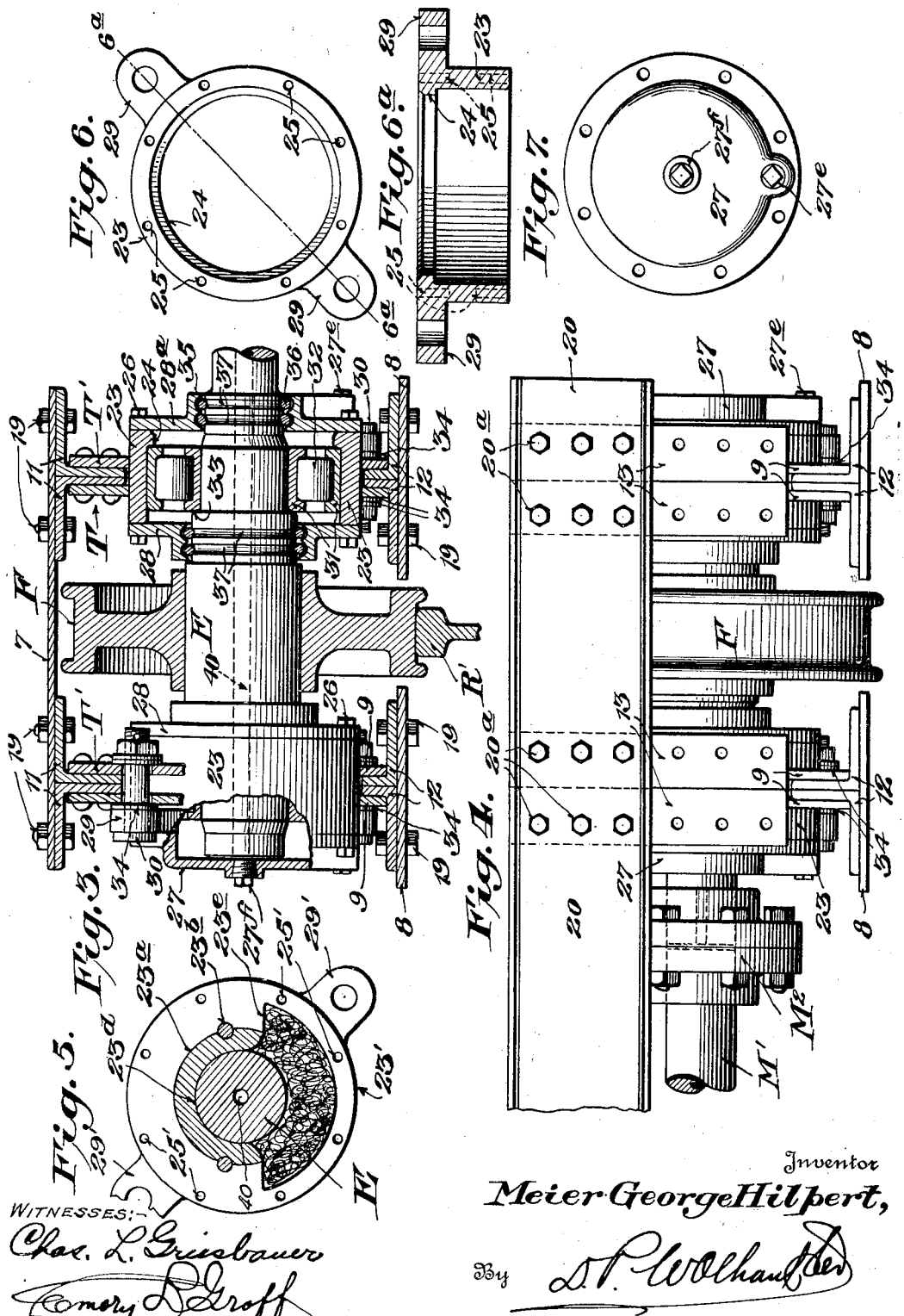

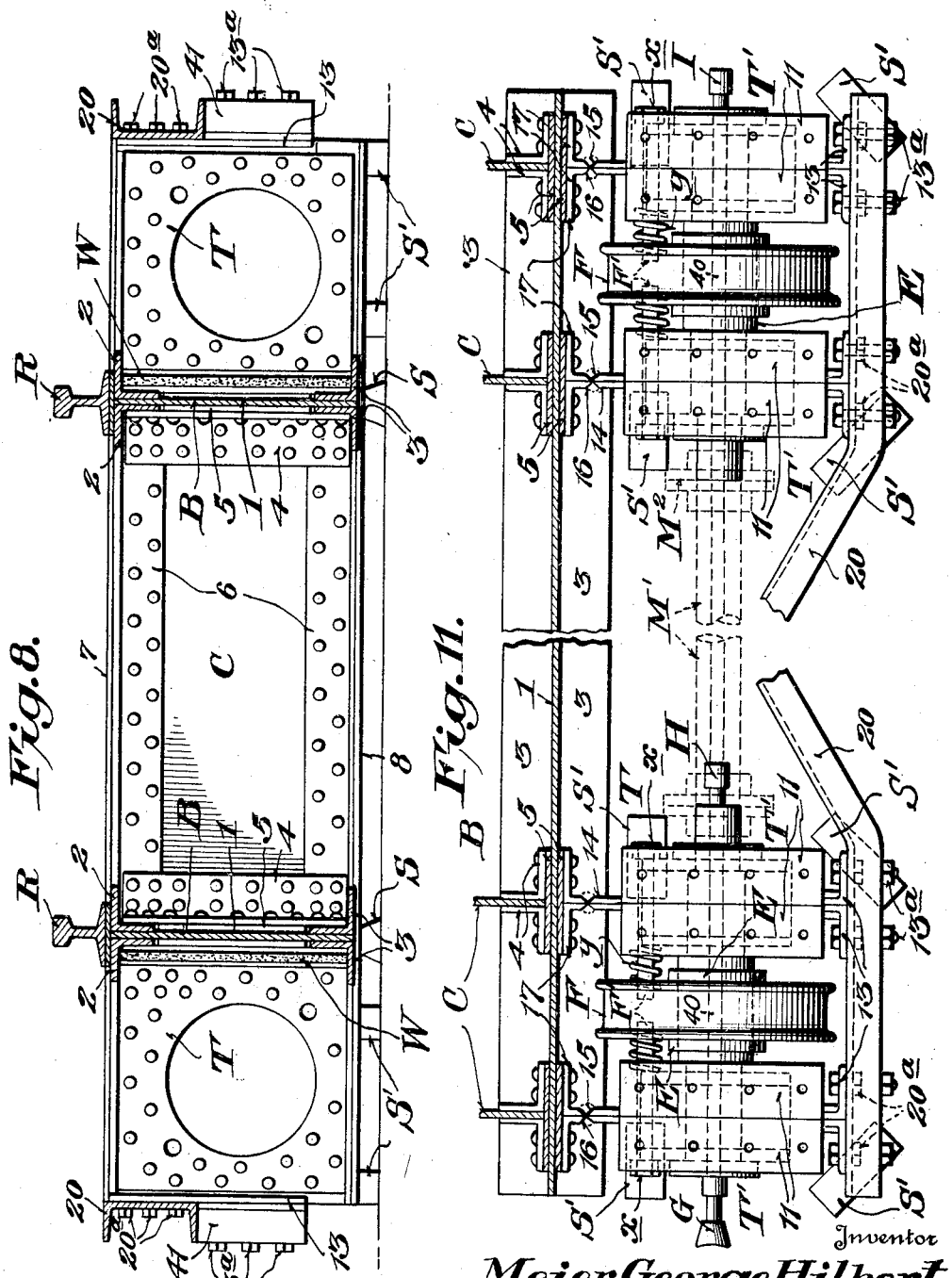

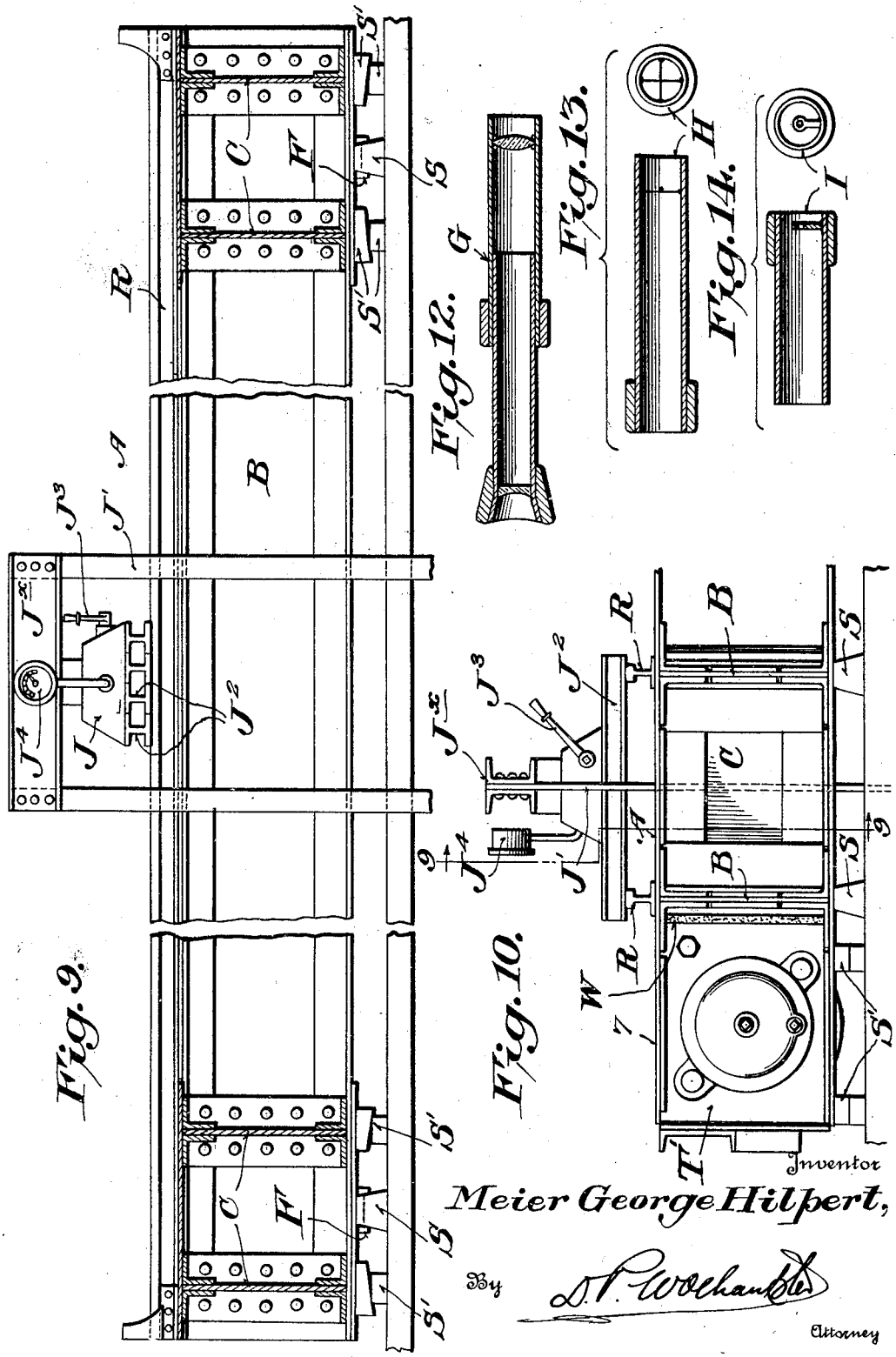

1,831,112

UNITED STATES PATENT OFFICE

MEIER G. HILPERT, OF BETHLEHEM, PENNSYLVANIA

FABRICATED TRUCK FOR CRANES AND THE LIKE AND METHOD OF CONSTRUCTING SAME

Application filed September 21, 1927. Serial No. 221,120.

This invention relates to a novel fabricated truck structure particularly adapted for use in connection with bridge cranes of different types, movable gantry or loading and unloading bridges, transfer tables, and turntables and the like devices, and to a novel method of constructing the same.

A primary object of the invention is to provide a light but strong construction which may be fabricated or built-up in such a way as to greatly facilitate the manufacture and assembly of the various parts and which permits of producing a truck for close clearances, and of maximum capacity with a minimum of cast iron or cast steel and a minimum of machine work. That is to say, the present invention contemplates a mobile span including loading members or girders and trucks therefor which are fabricated from structural steel plates and shapes, the loading member being pre-fabricated and then temporarily assembled and held together in such a way that relative adjustment may be effected between the two before being rigidly connected to insure true alinement of axles and true rolling of wheels on the crane rails, a necessary condition for the long life and maintenance of all heavily loaded bearings, particularly roller bearings.

Another object of the invention is to provide a construction which permits of readily and accurately alining trucks at the opposite ends of the crane or span so that initially the axles of opposite truck members may be alined with great precision and that their alinement may be checked at any time with ease and facility.

A further object of the invention is to provide a construction which permits of ready replacement of the roller bearings when desired or required, and which also enables the wheel and axle to be readily removed from the journal boxes for replacement or adjustment or repair.

A still further object of the invention is to provide a novel method of construction which permits of placing the load carrying members or girders under average loading stress and then assembling the trucks with reference thereto and welding the same while the loading member is under deflection so that when the crane is in use the trucks will be set and positioned to hold bearings properly for true rolling of wheels and to properly absorb and distribute the loading strains without causing them to be focused at any point which would likely cause failure or fracture.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a top plan view of a girder type crane constructed in accordance with the present invention.

Figure 2 is an enlarged detail elevation of one of the trucks with the cover plate for the journal box removed, and illustrating the manner of welding the truck unit to the loading girder.

Figure 3 is a vertical sectional view taken on the line 3—3 of Fig. 2.

Figure 4 is an end elevation of the construction shown in Figs. 2 and 3.

Figure 5 is a detail elevation of an alternate and interchangeable bearing and journal box complete with cover plates removed, the same being constructed to entirely replace the journal box and roller bearing unit as shown in Figure 2.

Figure 6 is a detail plan view of the journal ring.

Figure 6ª is a detail cross sectional view of ring shown in Figure 6 the same being a section taken on the line 6ª—6ª of Figure 6.

Figure 7 is an outside elevation of a solid cover plate as removed from Fig. 2 and shown in partial section in Fig. 3.

Figure 8 is a vertical sectional view taken on the line 8—8 of Figure 1 showing a complete elevation of a pair of truck frames attached or connected to the loading girder, but omitting the journal bearings and associated parts.

Figure 9 is a more or less diagrammatic vertical sectional view taken on the line 9—9 of Figure 10 and illustrating the loading member or girders resting upon blocks and being subjected to a loading pressure or strain by a loading jack for the purpose of placing the loading member under normal load before the truck members are permanently affixed thereto.

Figure 10 is an end elevation of the arrangement shown in Fig. 9 for placing the loading member under normal loaded condition.

Figure 11 is a diagrammatic plan view illustrating the manner of blocking and holding the fabricated pedestal plates in position to aline opposite trucks prior to welding the same to the normally loaded member or crane girder.

Figure 12 is a detail view of a telescope element adapted to be used in sighting the location of one axle with reference to an opposite axle.

Figures 13 and 14 are respectively sectional views of a cross-hair member and a sight member adapted to be used in conjunction with the telescope of Fig. 12 in the sighting operation.

Similar reference characters designate corresponding parts throughout the several figures of the drawings.

In carrying the present invention into effect it is to be understood that while the description and illustration herein is directed particularly to a truck construction for cranes, nevertheless, such construction may be readily adapted to other uses where it is desirable to connect a machinery supporting part to a structural element. In the present illustration, the structural element is shown in the form of a load carrying member designated generally as A and comprising the parallel girder members B constituting the main members of the structure and which are connected at opposite ends by the connecting webs or plates C thereby providing in effect a stable span type of loading member.

The loading member may be any type or form of girder such as the full web type shown in the drawings or it may be a girder of the latticed or truss type according to the character of span desired, or may be any stable construction of structurally rigid framework for example, the gantry crane in which case the trucks would be fastened to and alined from the ends of the trussed legs of the gantry crane while the bridge was loaded. In the present instance, a girder having a full-depth solid web has been selected as typical of travelling bridge cranes.

The girders B are preferably of the built-up or fabricated type and include the vertical web portions 1 having the upper angle members 2—2 forming the upper flange of the girder, and the bottom angles 3—3 forming the bottom flange. At the ends of the span where the several transverse connecting webs or plates C connect the ends of the girders B, the side angles 4 are riveted to the angles 2 and 3 and also to the filler members 5 thereby to produce a structurally rigid transverse box braced construction for the ends of the loading member. As will be apparent from Figs. 1, 8 and 11, the girders B—B are connected by a pair of the plate members C arranged in spaced relation, which in addition to being provided at the sides thereof with the angle members 4 are provided at the top and bottom edges with the angle members 6 whose horizontal legs lie in the same plane as the corresponding legs of the angles 2—2 and 3—3 of the girder thereby to permit of utilizing a top compression plate 7 and bottom tension plates 8 which together by extending beyond the loading girders B form in effect the compression and tension members for the truck frames. The top plate 7 is preferably a continuous single plate extending from outer end to outer end of the truck frames, and the bottom plates are also similarly continuous but spaced apart for wheel clearance. Thus, these plates not only contribute materially to the rigid bracing effect at the ends of the girders but also provide a principal or flange part of the truck housing. These plates 7 and 8 though shown permanently connected to angles 6 may also be detachably connected and thus a quicker knocking down of truck parts may be effected thereby. Also it is not necessary that these plates 7 and 8 be continuous from truck to truck on opposite sides of the loading member provided they are sufficiently connected to angles 6 or equal to transfer the full flange stresses of compression and tension arising from the offset loaded wheel to the loading member A.

The top or compression plate 7 may support the crane trolley rails R thereon, the vertical axes of the rails corresponding with the vertical axes of the webs of the girders B so that the full loading stresses on the rails will be equally and properly distributed throughout the entire loading member.

Referring now more particularly to the fabricated truck members which are so designed as to be fabricated and partially built or constructed in the shop and then set in position between the flange members or top and bottom plates 7 and 8, it will be observed from Figs. 3 and 4 that each truck designated generally at T comprises in addition to the flange members a pair of pedestal units designated generally as T'. These pedestal units are each composed of a pair of pedestal plates 9, the plates of both units being placed in a jig and made to accurately correspond as to size and journal box receiving openings 10. The said pedestal plates 9 are riveted or otherwise secured to a pair of top angles 11—11, bottom angles 12—12 and side angles 13—13 all of which have their adjacent legs arranged back to back for connecting the pedestal plates 9 and their outstanding legs adapted for attachment to one of the rigid parts of the truck. At the inside edges of the pedestal plates 9, that is the edge opposite the angles 13, the same are adapted to receive an attaching or connecting shear plate 14 placed between the plates 9.

The attaching plate 14 may be a member of single thickness or two plates secured together to provide a double thickness and the edge thereof is bevelled as indicated at 15 and adapted to cooperate with the bevelled edges 16 of a pair of angle members 17 arranged back to back and constituting shear members connected to the webs 1 of the girders B, thereby to provide a valley for receiving the material for forming a welded connection W between the attaching members 14 of the pedestal plates and the girder. The said welded connection W will be later referred to, but it may be here pointed out that the object of the same is to provide a convenient means for connecting the wheel bearing pedestals with the load bearing member after the axles and wheels at opposite ends of the crane have been properly lined up and adjusted thereby to insure the proper setting of the axles to insure maximum efficiency in performance under all normal loading conditions and to insure accuracy of alinement of the opposite trucks for right angle running on the crane runway.

In connection with the angle members 11, 12, and 13, it will be observed that the same are preferably riveted or otherwise secured permanently to the pedestal plates 9 before the same are fitted between members 7 and 8 constituting the truck flanges while the attaching plate 14 is secured to the said plates by the removable and replaceable bolts 18. Likewise the horizontal legs of the angles 11—11 and 12—12 are connected respectively to the flange plates 7 and 8 by the removable bolts or equivalent fastenings 19. The holes for the detachable bolts 18 and 19 are drilled through the plates 7 and 8 or through the legs of angles 11 and 12 after the pedestal units have been adjusted and alined in place between the flange plates, one series of holes having been drilled to a jig in advance. In practice, when alining the axles, thin fillers or liners of variable thicknesses must be used between angles 11—11 and 12—12 and the flange plates 7 and 8 particularly to take care of the deflections of members B under their dead weight plus normal loadings and such fillers or liners must also be drilled through for bolts 18 and 19.

The arrangement above described permits of removing either one or both pedestal units T' from between the flange members or plates 7 and 8 whenever desired or required even after the permanent welded connection W has been made between the members 14 and the shear members 17 by simply removing the bolts 18 and 19 and sliding the part or entire assembly endwise from between the plates 7 and 8, the angular brace member 20 being first disconnected from girder gusset plate 22. The said brace 20 and end plate 21 are attached to the outstanding legs of the angles 13 as shown in Figs. 1, 2, 4, 8 and 11; and the angular braces 20 are preferably of channel formation and not only serve to act as a part of the cover for the journal box construction but are also adapted to be connected as indicated at 22 in Fig. 1 to the flanges or webs of the girders B thereby to resist the thrusts of wheel flanges as transferred to the pedestal plates.

Referring further to the members T' which include the pedestal plates 9 having the circular central opening 10, it will be observed that said opening is adapted to receive a novel journal box construction which includes in its organization a journal ring 23 open at both sides and provided with an interior race engaging shoulder 24 while the opposite side edges thereof are tapped as indicated at 25 to receive the fastenings 26 for securing the cover plates 27, 28 and 28$^a$ thereto. The said journal ring 23 is also provided with the integral offset thrust ears 29 which are provided with openings for receiving the thrust bolts 30, the said thrust bolts being adapted to pass through suitable openings provided therefor in the plates 9 and angles 12 in the case of the lower bolt, thereby to lock the complete journal box comprising the ring 23 and the said cover plates and the pedestal units T'.

The inside of the ring 23 is adapted to receive suitable roller races 31 having the roller bearings 32 therebetween, and the outer part of the race 31 is adapted to be engaged by the shoulder 24 on the interior of the journal member thereby to hold the entire race firmly against the shoulder 33 on the axle designated generally as E. For the purpose of enabling the journal ring to be adjusted to compensate for wear in the races or on the axle E suitable washers or shims 34 may be placed between the inside faces of the thrust lugs 29 and the plates 9 so that when wear occurs the shims or washers may be removed and the entire ring moved further inwardly thereby to cause the shoulder 24 to always maintain the roller unit 31 in abutting relation with the shoulder 33 on the axle and thus prevent lateral play or looseness between the bearing and wheel units.

The inside cover plates 28 and the cover plates 28$^a$ through which the power axle passes are all provided with flanges 35 which are interiorly grooved to receive the lubricant retaining washers 36 which are preferably made of spring wire or rods and are snapped into the oil-seal grooves 37 in the axle E. Thus the fluid lubricant provided within the journal box will be properly retained and the proper lubrication of the axle bearing always insured.

The cover plates 27, 28 and 28ª are all provided with holes to register with tapped holes 25 in journal ring 23 and the plates 27 and 28ª are provided with a sump drain plug 27ᵉ while each cover 27 which does not have an opening for axle extension has a small central opening 27ᶠ arranged to register with the central opening in axle E and adapted to receive a closure plug to make the box dust proof and retain the lubricant.

An alternate form of journal ring 23' with thrust lugs 29' and tapped holes 25' for covers 27, 28 or 28ª is shown in elevation (Fig. 5). This journal unit employs brass or other anti-friction metal 23ª which is machined to bear directly against the outer journal cover and to fit the axle with an abutting shoulder against 33 and is keyed to ring 23' by keys 23ᵇ thereby being held in position on top of axle E and in the same relation thereto as the race and roller unit 31—32. The bottom of ring 23' is cored out as indicated at 23ᵉ to receive a quantity of oil waste and lubricant which latter is fed between friction surfaces at 23ᵈ.

This alternate journal completely replaces every feature of the unit 23—31—32 except as to the amount of friction. It may be ordered initially for permanent use, may be used only to aline and adjust the truck members prior to welding at W or may be used temporarily as an expedient to replace any roller bearing that has failed until such time as replacements arrive.

The axle E above referred to carries a press fitted wheel F and is preferably centrally drilled full length with a standard diameter hole 40 which hole or bore is utilized in the present instance to assist the exact alinement and positioning of the truck members at opposite ends of the girder.

Referring to the method of constructing the crane or other apparatus to which the present structure is adapted to be connected, it may be observed from Fig. 9 of the drawings that the loading member designated generally as A and including the girder elements B and cross braces C are first fabricated and set up on the shop floor on suitable supports S located in line with crane wheels or rail, the same being preferably of two parts and wedge type to assist in adjusting and alining both ends of the span so that they will be perfectly level. Also the trucks T are supported on suitable adjustable blocks S', plates 8 then acting as fillers with wheels F precisely in the position as if on the rails R' upon which the completed crane would travel.

It will, of course, be understood that the top compression plate 7 or flange member and the bottom tension plates 8 have been previously fitted to the loading member or girder as indicated in Fig. 8 so that the trucks T, including the pedestal units T' may be slid into position between the said plates thus completing the truck frame.

The pedestal units T' have been previously exactly fabricated to jigs, that is, the pedestal plates 9 have been provided with the journal openings 10 and have also been fitted with the angles 11, 12 and 13 as well as the attaching members 14 and the pedestal units T' are then fitted to a wheel F, axle E, and journal unit 23. For the purpose of temporarily holding the wheel, journal boxes and pedestal units as thus assembled, the wheels F are provided with the tapped sockets F' to receive the temporary holding bolts $x$ which have strong springs $y$ arranged between the wheel F and the inside plates 9 of the pedestal units, and the said bolts $x$ extending through the openings into which the permanent thrust bolts 30 are later to be inserted. The effect of the springs $y$ is to resiliently press the pedestal plates 9 against the thrust ears 29 and temporary bolt heads $x$ so that adjustment and alinement of plates 9 and 14 may be readily effected and then held. The angles 13 of the pedestal units T' are connected by the temporary spacing members 41 (Fig. 8) and the channel braces 20 by the bolts 20ª thus alining the outer ends of truck T. The partial truck is thus held temporarily assembled and may be slid between the plates 7 and 8 constituting the flanges of said truck T. The temporary spacing member 41 may be a relatively heavy piece of wood or the like.

When the truck unit is thus placed between the compression plate 7 and the tension plates 8, the loading member A may be placed under load equivalent to the actual load to be carried thereby to secure the normal deflection of girders B about supports S. For the purpose of placing the loading member under stress to effect deflection, a suitable jack J may be placed at the middle of the span as shown in Fig. 9, the yoke Jˣ of the said jack being connected with the floor of the shop by the members J' and provided with a bridge J² spanning the rails R, and then the jack handle J³ may be manipulated to produce the desired load which may be visibly indicated on the gauge J⁴.

While the loading member A is deflected, the pedestal units T' of the trucks may be adjusted by manipulating S'—S' so that the axles E of the truck units at opposite ends of the span may be accurately alined by a novel sighting method which involves the use of the sighting tools shown in the Figures 12, 13 and 14. Figure 12 shows a telescope G fitted at one end with an eye piece and at the opposite end with a lens, while Figs. 13 and 14 respectively show a cross hair tube and a sight tube designated as H and I. The tubular portions of the tools G, H, and I are all of the same diameter and are adapted to fit in the bore 40 of the axle, the telescope G being inserted in the front end of the axle as shown in Fig. 11 and the cross hair tube H being fitted in the opposite end of the same axle while the sight tube I is fitted in the far end of the axle E of the opposite truck. The pedestal units T' are then adjusted so that the axles E of opposite trucks will be in perfect alinement with the attaching members 14 abutting against the shear members 17 even though the loading member A is deflected. The attaching members 14 may then be permanently welded to the shear members 17 thereby insuring perfect alinement be'ween the pedestal units T' and the loading member as deflected by normal load.

Upon alining axles E it is evident that attaching members 14 cannot parallel shear members 17 in either direction and it is only necessary that they be near enough to perform a permanent shear weld. Should the members 14 in the process of alining interfere with members 17 either may be quickly reduced at the points of interference by chipping or burning to proper bevel for welding. It is to be particularly noted that this precision method of joining machine and structural members not only eliminates the deflections due to loading but also the bends, warps, and winds inherent in every fabricated structural member as span A which inherent misalinements are not noticeable or objectionable until the attachment of machine parts is attempted.

While the span A is still under jack load, the holes for the detachable bolts 19 may be drilled through the horizontal legs of the upper angles 11 using the jig drilled holes through the compression plate 7 as a templet and likewise the holes may be drilled for the bolts 19 through the horizontal legs of the lower angles 12 using the tension plates 8 as templets. The said bolts 19 may be then placed in position and the bolts 18 connecting the attaching plates 14 with the plates 9 may likewise be tightened to detachably lock the entire pedestal unit and wheel-journal unit in place.

In the case of slow moving equipment, where brass bearings may suffice and provision for repair and replacement is of no consequence a cheaper and somewhat stronger construction may be had by using rivets in the case of bolts 18 and 19 and through the members 20 and 21.

The temporary bolts $x$ and springs $y$ may be removed from the sockets F' in the wheel F and then pulled out of the openings in the pedestal plates to permit of the insertion of the thrust bolts 30 which pass through the ears 29 of the journal ring and accordingly hold the entire journal box construction to the pedestal units which are now rigidly welded to span girders.

The temporary spacing member 41 (Fig. 8) may then be removed and the permanent end plate 21 secured in place. Also, the ends 22 of the channel braces 20 may be detachably connected to the sides of the girders B completing the assembly of the structural parts of the device.

By reference to Figure 1 of the drawings it will be observed that one of the girders B has a motor M supported thereby, the said motor being adapted to drive the shafts M' which are connected by suitable couplings $M^2$ with the axles E of opposite trucks thereby to provide the necessary motive power for the crane.

From the foregoing it will be apparent that the present invention not only provides a novel method of attaching trucks to a travelling crane or equivalent construction, but also provides a novel fabricated truck construction having many advantages over constructions of this type now generally in use. In the first place, a fabricated truck of the type shown herein is stronger for its weight because its members are of maximum depth and width and hence greater strength per inch of steel. Furthermore, the truck is better braced than any heretofore made since it provides a truck which is boxed in on all six sides, the heavily webbed girder member B with its heavy flange angles forming one side which with span diaphragms C give rigid foundations for the flange sides, that is, the top and bottom sides and also for both pedestal sides. Also the present construction is most easily and quickly installed because all of the fabricating work can be cheaply performed and completely assembled in the shop or the parts may be shipped to the erection site and put together with facility and accuracy under actual load conditions. When the device is in use the hollow axles E afford ready means for checking axle alinement at any time through the use of the tools G, H and I.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A crane or like construction fabricated from structural steel parts including in combination, a loading member including a vertical plate, a fabricated wheeled truck including a top compression plate and a bottom tension plate and a wheel bearing unit arranged therebetween, and means for permanently connecting a part of the unit with the vertical plate of the loading member.

2. A crane or like construction fabricated from structural steel plates and shapes including in combination with a loading member, a wheeled truck unit, and means for permanently connecting a part of the truck unit with the loading member while the latter is deflected under load.

3. A crane or like construction fabricated from structural steel plates and shapes including in combination a loading member, a wheeled truck unit, a truck frame for embracing the top and bottom sides of the truck unit, means for permanently connecting a part of the truck unit with the loading member, and means for rigidly and releasably connecting the truck unit with the said truck frame.

4. A crane or like construction fabricated from structural steel plates and shapes including in combination. a built-up loading member, and a pre-fabricated truck unit adapted to be assembled and temporarily fitted to the loading member prior to permanently connecting the same thereto, and means for rigidly connecting the truck unit to the loading member.

5. A fabricated truck construction including in combination, a loading member including a vertical plate, a truck frame including a top compression plate and a bottom tension plate and fabricated pedestal units mounted between said plates. journal boxes mounted in said pedestal units. a wheel carrying axle mounted in said journal boxes and means for permanently connecting a part of the pedestal units with the loading member.

6. A fabricated truck construction including in combination. a loading member including a vertical plate, a truck frame including a top compression plate and a bottom tension plate. a pair of fabricated pedestal units mounted at opposite sides of the loading member and secured to the plates of said truck frame and to the loading member. journal boxes mounted in said pedestal units. and a wheel carrying axle mounted in said journal box.

7. A fabricated truck construction including in combination with a loading member. a truck frame comprising a top compression plate and a bottom tension plate, a pair of fabricated pedestal units mounted between said compression and tension plates, journal rings adjustably engaging said pedestal units, and a wheel carrying axle mounted in said journal rings.

8. A truck construction including in combination a loading member, spaced upper and lower frame parts at one end thereof, shear members carried by the loading member, and a pre-fabricated truck unit adapted to be connected to said shear members.

9. A truck construction including in combination with a loading member, spaced upper and lower frame parts at each end thereof, shear members carried by the loading member, a pre-fabricated truck unit adapted to be connected to said shear members, and means for rigidly connecting said truck unit with the frame parts.

10. A truck construction including in combination with a loading member, spaced upper and lower frame parts at one end thereof, shear members carried by the loading member, and a pre-fabricated truck unit including spaced pedestal units adapted to be connected to said shear members, and means for also rigidly connecting said pedestal units with said frame parts.

11. A truck construction including in combination with a loading member, spaced upper and lower frame parts at one end thereof, shear members carried by the loading member, and a pre-fabricated truck unit including spaced pedestal units each having an attaching member, means for permanently connecting the attaching member of each pedestal unit with the shear members, and means for rigidly but detachably connecting the pedestal units with the frame parts and with the attaching member.

12. A fabricated truck construction including in combination with a loading member, spaced upper and lower frame parts at an end thereof, shear members carried by the loading member between said spaced frame parts, and a pre-fabricated truck unit including spaced pedestal units each having an attaching member adapted to be welded to the shear members, journal rings having a laterally adjustable bolting connection with the pedestal units, and a wheeled axle mounted in said journal rings.

13. A fabricated truck construction including in combination with a loading member, spaced upper and lower frame parts, shear members carried by the loading member between said spaced frame parts a wheel carrying truck unit adapted to be slidably fitted between said spaced upper and lower frame parts, means for rigidly connecting said truck unit with said upper and lower frame parts, and means for connecting said truck unit with the shear members comprising an attaching member adapted to be permanently connected with the shear members and detachably connected at its other edge with the truck.

14. A truck construction including in combination with a loading member, spaced upper and lower members constituting a truck frame, a shear member carried by the loading member and a wheel carrying truck unit adapted to be adjustably fitted between said frame members, and means for permanently connecting a part of the truck unit with the shear member, and means whereby said truck unit may be removed from the frame and from said part which is permanently connected with the shear member.

15. A mobile crane including in combination, adjustable truck units having wheels and axles, the latter having central holes, and means whereby the axles of opposite truck units may be alined through said holes.

16. A mobile crane including adjustable truck units, means for alining the same, and welds for integrally connecting the truck units with the crane after alinement.

17. A structural crane having a shear member in combination with structural truck units including pedestal members which are capable of adjustment with reference to the crane, and means for making said pedestal members integral with the shear members of the crane.

18. A structural crane having wheeled truck units, shear members thereon, the flange members of which are fabricated with the crane, and pedestal members fitted between the flange members and made integral with the shear members on the crane after the alinement of truck axles.

19. A mobile structural span in combination with truck flange members extending therefrom, truck shear members cantilevering therefrom, and welds integrally connecting said shear members and truck flange members.

20. A fabricated truck of box form having plate pedestals, closely fitting bearings therethrough, fitted and bored axles in said bearings, said pedestals being alined by sighting means operable through holes in axles before being made integral with a mobile structural span for shear.

21. A fabricated truck of box form having plate pedestals, turned bearings fitted therein, thrust bolts for holding the bearings in the pedestals and shims whereby they may be laterally adjusted.

22. A fabricated truck including a vertical pedestal member having an opening, a bearing ring having offset ears whereby the ring can enter the opening while the ears parallel the sides of the pedestal, and means for connecting said ears with the pedestal whereby adjustment of the ring may be effected in line with the longitudinal axis thereof.

In testimony whereof I hereunto affix my signature.

MEIER G. HILPERT.